May 15, 1923.
W. PATERSON
1,455,505
FILTERING APPARATUS
Filed Sept. 9, 1922
2 Sheets-Sheet 1
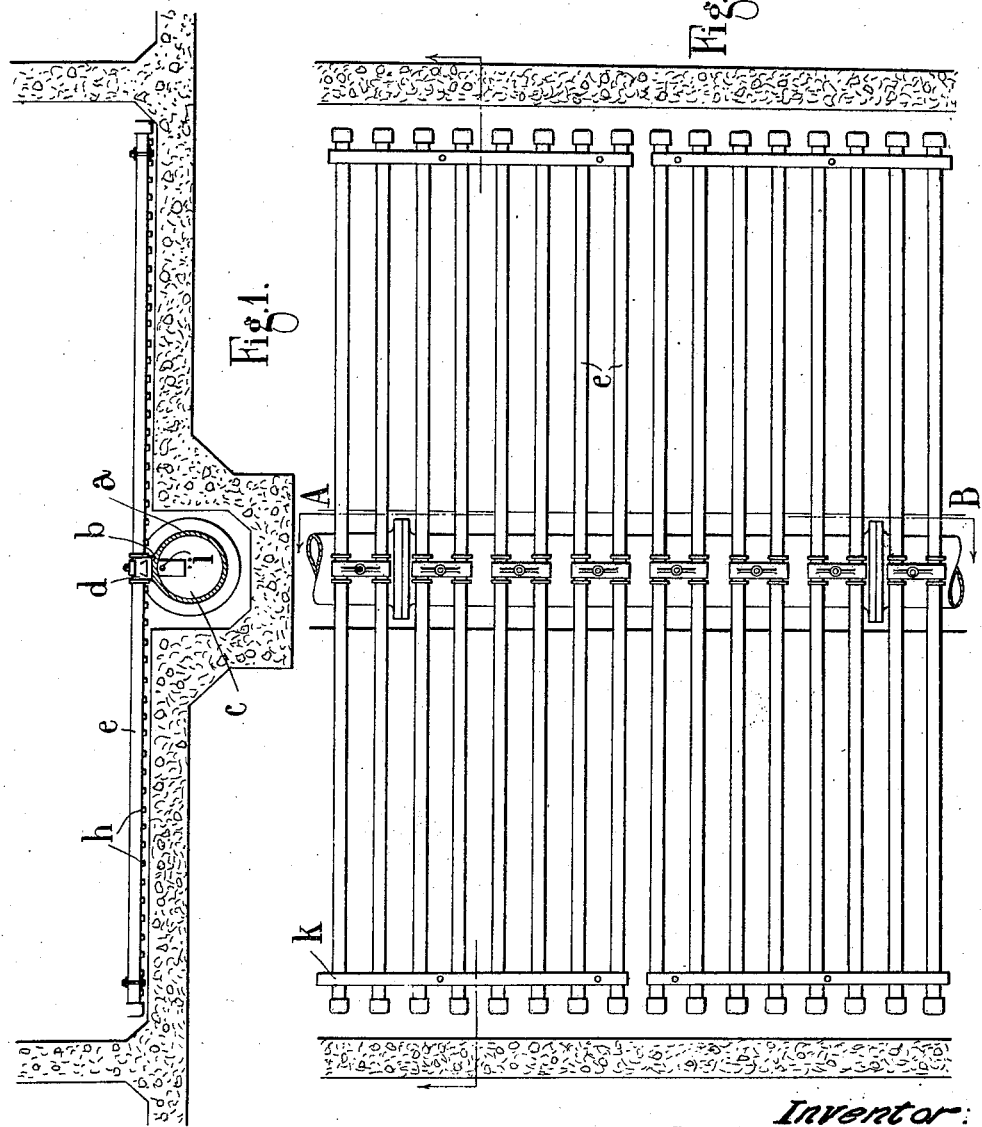
Inventor:
W. Paterson
By Marker Clerk
Attys Patented May 15, 1923.

1,455,505

UNITED STATES PATENT OFFICE.

WILLIAM PATERSON, OF LONDON, ENGLAND.

FILTERING APPARATUS.

Application filed September 9, 1922. Serial No. 587,135.

*To all whom it may concern:*

Be it known that I, WILLIAM PATERSON, a subject of the King of Great Britain and Ireland, and residing at Windsor House, Kingsway, London, W. C. 2, England, have invented certain new and useful Improvements in Filtering Apparatus, of which the following is a specification.

This invention relates to filtering apparatus of the type provided with a manifold pipe system for the collection of filtered liquid and for the distribution of compressed air and wash water for cleansing the filter bed when required.

The object of the present invention is to provide for the uniform distribution of air and wash water, while at the same time arranging for a system which may be readily assembled and dismantled, and easily accessible for inspection, renewal and repair, if and when required.

The invention consists in filtering apparatus of the type referred to, provided with a manifold pipe system adapted to be superposed upon the main collecting or distributing header in the form of a channel or tube.

More specifically, the invention consists in filtering apparatus of the type referred to provided with a main collecting or distributing header arranged so that its upper surface is substantially flush with the bottom of the filter bed, a manifold pipe system comprising a plurality of pipes, each having a series of apertures arranged along its length and superposed upon said main collecting or distributing header and means for placing in communication with one another the interiors of the main header and the manifold pipes.

The invention also consists in filtering apparatus of the above character, in which the manifold pipes are connected with the main header by means of a T-piece the limb of which passes through an aperture in the main header, the pipes being held in position by suitable clamping means.

The invention also consists in the other details and arrangements hereinafter described or indicated.

The accompanying drawings illustrate one mode of carrying out the invention:—

Figure 1 is a sectional elevation showing a part of one form of filter in accordance with the invention;

Figure 2 is a plan, and

Figure 3:
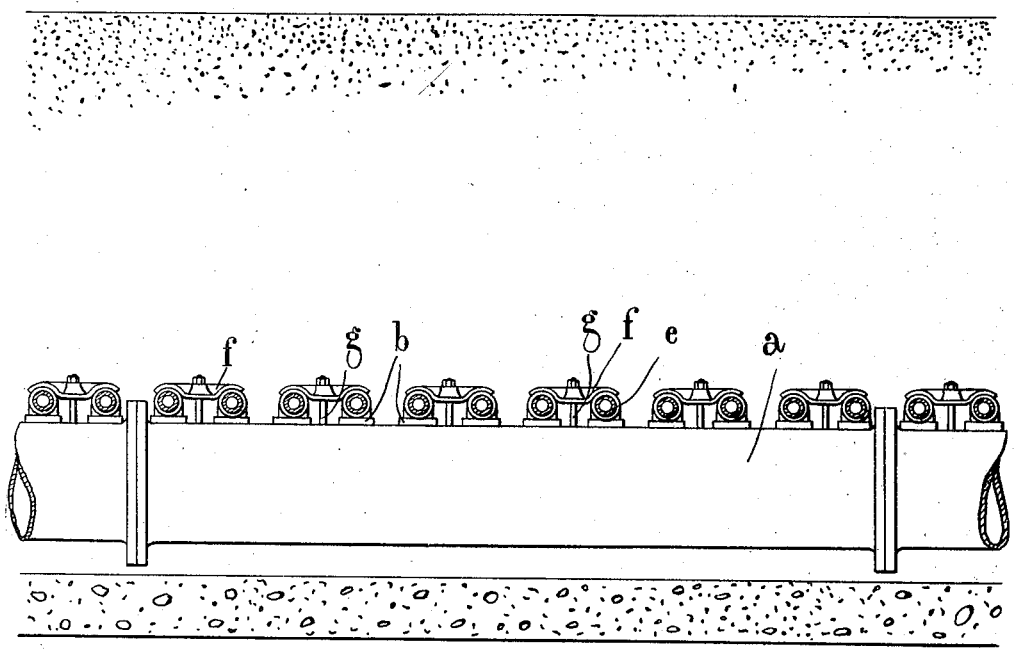
Figure 3 is a section on the line A—B of Figure 2 looking in the direction of the arrows.

In carrying my invention into effect in one convenient manner as, for example, in its application to apparatus for filtering water, I arrange beneath the filter bed a main collecting or distributing header $a$ in the form of a channel or tube which may be formed of metal, earthenware or other suitable material and which is so positioned that its upper surface is substantially flush with the lower surface of the filter bed. Along the length of this header or pipe I provide a series of apertured bosses $b$ through each of which passes the limb $c$ of a T-piece $d$ to the lateral parts of the head of which are secured the manifold tubes or pipes $e$ by screwing or otherwise, the arrangement being such that a plurality of tubes may thus be arranged transversely in relation to the main header and superposed thereon, as shown, the tubes being held down in pairs or singly or in any other convenient number by means of clamping plates $f$ and studs $g$ or the like screwed or otherwise fixed into the header and passing through said clamping plates.

The strainer tubes may be made of metal, porcelain or other suitable material and are provided with apertures $h$ in their under sides, and it will be seen that by this arrangement I secure a very even distribution throughout the system while at the same time providing for a system which may be conveniently assembled from above and which may be rapidly and readily dismantled if and when required, while at the same time possessing the additional advantage, as compared with existing arrangements, that there is very little, if any portion, of the filter bed occupied by projecting pipes or tubes. I may also provide one or two T or other shaped venting holes (not shown) on top of the header and of the manifold tubes, preferably with side discharges.

The limbs or extensions $c$ of the T-pieces projecting into the interior of the header provide for a very even distribution of compressed air when the same is to be introduced, since the said extensions form water seals, with the result that the compressed air on entering the system has first to expel the water from the header down to the level at the bottom of the extension or limb and then from the manifold tubes.

Moreover, each of said limbs or extensions is furnished with a small vent $i$ ensuring uniform distribution of the air with the water first ejected by the compressed air and also facilitating the exit of air from the manifold pipe system when the air is cut off and wash water applied.

It will be understood that the invention is not to be confined to any particular form or construction of filtering apparatus, nor to any particular materials from which the various parts of my improved distributing and collecting system are formed, while at the same time I may modify the number and arrangement of the distributing and collecting pipes and the means for securing the same in a superposed position upon the main header, as may be determined by any particular practical requirements that may have to be fulfilled.

Moreover, in addition to providing for the central clamping of the pipes upon the header, the outer ends of the same may also be retained in position, if necessary or desirable, by means of subsidiary clamping plates or bars $k$.

Having now described my invention, what I claim as new and desire to secure by Letters Patent is:—

1. A filtering apparatus including a foundation provided with a substantially horizontal surface, a header arranged mainly below said horizontal surface and provided on its upper side with spaced apertured bosses, T-pieces having vertical limbs extending into the header through said bosses, oppositely extending apertured pipes extending over said horizontal surface and connected to said T-pieces, clamping plates engaging said T-pieces, and locking members engaging the clamping plates for holding the T-pieces and apertured pipes in connection with said header.

2. Filtering apparatus of the type referred to comprising a main collecting and distributing header having a plurality of apertured bosses along its upper surface, a T-piece loosely inserted into each of said apertures, apertured pipes secured to the lateral parts of the head of each T-piece, and clamping means for holding said T-pieces in position, the limb of each T-piece extending into the header and provided with a vent hole arranged within the header.

3. Filtering apparatus of the type referred to comprising a main collecting and distributing header in the form of a tube so arranged that its upper surface is substantially flush with the lower surface of the filter bed and having a plurality of apertured bosses along its length, T-pieces having apertured pipes extending laterally therefrom and their limbs extending into the header through the apertured bosses and clamping plates for the T-pieces and for the outer ends of said apertured pipes for the purpose of holding the same in position.

In testimony whereof I have signed my name to this specification.

WM. PATERSON.